United States Patent
Tsushima

(10) Patent No.: US 11,974,157 B2
(45) Date of Patent: Apr. 30, 2024

(54) INFORMATION PROCESSING DEVICE, MOVING OBJECT, COMPUTER-READABLE STORAGE MEDIUM, AND INFORMATION PROCESSING METHOD

(71) Applicant: HONDA MOTOR CO., LTD., Tokyo (JP)

(72) Inventor: Kosei Tsushima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 163 days.

(21) Appl. No.: 17/496,777

(22) Filed: Oct. 8, 2021

(65) Prior Publication Data

US 2022/0141701 A1  May 5, 2022

(30) Foreign Application Priority Data

Oct. 29, 2020 (JP) ................................ 2020-181604

(51) Int. Cl.
*H04W 28/02* (2009.01)
*H04L 43/0888* (2022.01)
(Continued)

(52) U.S. Cl.
CPC ..... *H04W 28/0231* (2013.01); *H04L 43/0888* (2013.01); *H04L 47/24* (2013.01); *H04W 4/40* (2018.02)

(58) Field of Classification Search
None
See application file for complete search history.

(56) References Cited

U.S. PATENT DOCUMENTS

2008/0184011 A1  7/2008  Busck
2015/0271827 A1  9/2015  Hamalainen
(Continued)

FOREIGN PATENT DOCUMENTS

CN    101611380 A    12/2009
CN    105228180 A    1/2016
(Continued)

OTHER PUBLICATIONS

NEC Corporation, "Video distribution technology to support surveillance, emergency services, and disaster prevention and response (adaptive video feed control)", accessed on Sep. 24, 2021, URL:https://jpn.nec.com/rd/tg/smc/research/adaptive_video_feed_control.html.
(Continued)

*Primary Examiner* — Saumit Shah

(57) ABSTRACT

An information processing device, having a communication unit for wirelessly communicating with an external device, includes: a throughput measurement unit for measuring communication throughput with the external device; a throughput prediction unit for predicting future communication throughput by using at least data of the measured throughput; a communication control unit for controlling data communication with the external device based on the predicted throughput; a communication determination unit for determining a type of the data communication with the external device; and a priority setting unit for setting priorities of communications for a plurality of the data communications based on the determined type, in which the communication control unit is for limiting the throughput for the data communication for which the set priority is low, in comparison with the data communication for which the set priority is high, when the future throughput is below a predetermined threshold value.

9 Claims, 10 Drawing Sheets

(51) Int. Cl.
*H04L 47/24* (2022.01)
*H04W 4/40* (2018.01)

(56) References Cited

U.S. PATENT DOCUMENTS

| | | | |
|---|---|---|---|
| 2016/0042101 A1 | 2/2016 | Yoshida | |
| 2016/0294707 A1* | 10/2016 | Chen | H04L 67/12 |
| 2019/0109799 A1* | 4/2019 | Nipane | H04L 41/0894 |
| 2019/0149475 A1* | 5/2019 | Martin | H04L 47/24 370/235 |
| 2020/0059438 A1 | 2/2020 | Ogawa | |
| 2020/0252147 A1* | 8/2020 | Jana | H04B 17/373 |
| 2020/0280883 A1 | 9/2020 | Inoue | |
| 2020/0328947 A1 | 10/2020 | Iwai | |
| 2021/0114616 A1* | 4/2021 | Altman | H04N 21/41422 |

FOREIGN PATENT DOCUMENTS

| | | |
|---|---|---|
| JP | 2004120221 A | 4/2004 |
| JP | 2008199381 A | 8/2008 |
| JP | 2010213098 A | 9/2010 |
| JP | 2012004779 A | 1/2012 |
| JP | 2016082438 A | 5/2016 |
| JP | 2018074244 A | 5/2018 |
| JP | 6337881 B2 | 6/2018 |
| JP | 6390167 B2 | 9/2018 |
| WO | 2011074116 A1 | 6/2011 |
| WO | 2018211488 A1 | 11/2018 |
| WO | 2019082965 A1 | 5/2019 |

OTHER PUBLICATIONS

Hiroshi Yoshida, et al., "Video Streaming technology that supports public safety", NEC Technical Report, Sep. 2017, vol. 70, No. 1, p. 52-55.
Office Action issued for counterpart Japanese Application No. 2020-181604, transmitted from the Japanese Patent Office dated Oct. 3, 2023 (drafted on Sep. 28, 2023).
Office Action issued for counterpart Chinese Application 202110903824. X, issued by The State Intellectual Property Office of People's Republic of China on Dec. 27, 2023.

* cited by examiner

| CATEGORY | | PROPERTY | | SERVICE |
|---|---|---|---|---|
| LOW | NON-CONTROL SYSTEM | LOW | UNSTEADY | Web BROWSING |
| | | | | NEWS APPLICATION, MICROBLOGGING APPLICATOIN, SNS APPLICATION |
| | | | | GAME |
| | | HIGH | STEADY | FILE DOWNLOAD |
| | | | | MOVING IMAGE DISTRIBUTION SERVICE, MUSIC DISTRIBUTION SERVICE |
| | | | | INTERACTIVE COMMUNICATION |
| HIGH | CONTROL SYSTEM | LOW | UNSTEADY | PROBE VEHICLE DATA |
| | | | | DOWNLOAD OF MAP DATA FOR NAVIGATION, REMOTE OPERATION (OPERATION OF ENGINE, AIR CONDITIONER, SWITCH, OR THE LIKE) |
| | | | | REMOTE OPERATION |
| | | HIGH | STEADY | DOWNLOAD OF MAP DATA (FOR AUTONOMOUS DRIVING) |
| | | | | CAMERA DATA·VOICE DATA (FOR AUTONOMOUS DRIVING) |
| | | | | RADAR DATA· LIDAR DATA (FOR AUTONOMOUS DRIVING) |

*FIG. 3*

| IP ADDRESS | PORT NUMBER | PRIORITY | TYPE ID | (MINIMUM QUALITY) |
|---|---|---|---|---|
| xxx.xxx.xxx.xxx | 49152 | 10 | 1 | 2 |
| xxx.xxx.xxx.yyy | 49153 | 1 | 2 | 1 |
| . | . | . | . | . |
| . | . | . | . | . |
| . | . | . | . | . |

*FIG. 4*

INFORMATION PROCESSING DEVICE, MOVING OBJECT, COMPUTER-READABLE STORAGE MEDIUM, AND INFORMATION PROCESSING METHOD

The contents of the following Japanese patent application are incorporated herein by reference: Japanese Patent Application NO. 2020-181604 filed on Oct. 29, 2020.

BACKGROUND

1. Technical Field

The present invention relates to an information processing device, a moving object, a computer-readable storage medium, and an information processing method. 2.

Related Art

Patent Document 1 and Patent Document 2 disclose a technology for predicting, based on time series data of communication throughput, time series data of future communication throughput. Non-Patent Document 1 and Non-Patent Document 2 discloses adaptive control technology for avoiding degradation of video quality, due to excessive compression, to distribute video by controlling a compression rate and the number of frames based on prediction of communication throughput.

CITATION LIST

Patent Document

Patent Document 1: Japanese Patent No. 6337881
Patent Document 2: Japanese Patent No. 6390167

Non-Patent Document

Non-Patent Document 1: "Video distribution technology to support surveillance, emergency services, and disaster prevention and response (adaptive video feed control)", [online], NEC Corporation, [Search on September 24, 2nd year of Reiwa], Internet <URL:https://jpn.nec.com/rd/tg/smc/research/adaptive_video_feed_control.html>

Non-Patent Document 2: Hiroshi Yoshida, and three more persons, "Video Streaming technology that supports public safety", NEC Technical Report, September 2017, Vol. 70, No. 1, p. 52-55

BRIEF DESCRIPTION OF THE DRAWINGS

FIG. 3 is a table showing a priority of a data communication.

FIG. 4 shows an example of a data structure of data communication information stored in an information processing device 200.

DESCRIPTION OF EXEMPLARY EMBODIMENTS

Hereinafter, the invention will be described through embodiments of the invention, but the following embodiments do not limit the invention according to claims. Further, not all the combinations of features described in the embodiments are essential for means to solve the problem in the invention.

Figure 1:
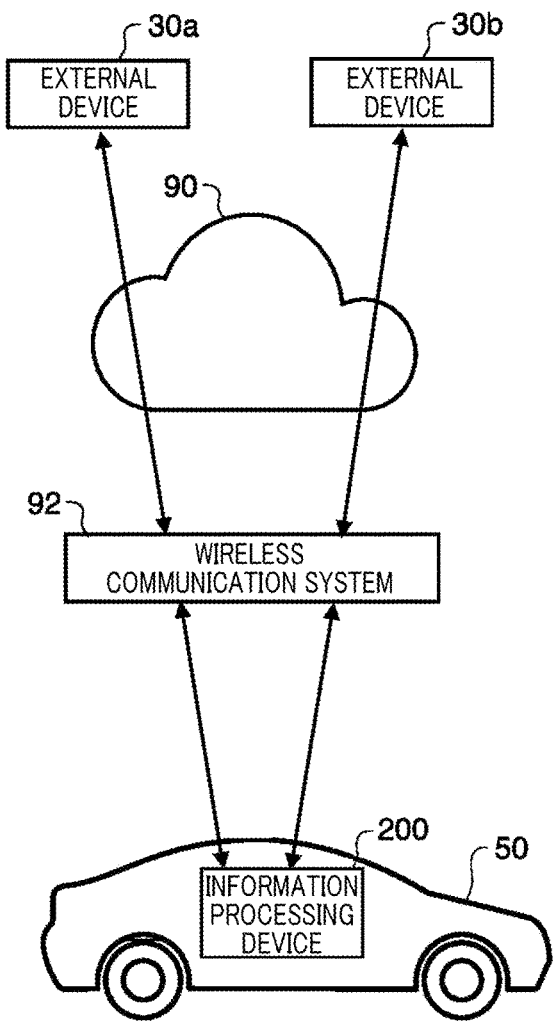
FIG. 1 schematically shows a usage mode of a vehicle 50 according to an embodiment.

FIG. 1 schematically shows a usage mode of a vehicle 50 according to an embodiment. The vehicle 50 is, for example, an automobile. The vehicle 50 may be an automobile equipped with an internal combustion engine, an electric vehicle, a fuel cell vehicle (FCV), or the like. The vehicle 50 is an example of transportation equipment.

The vehicle 50 includes an information processing device 200. The information processing device 200 performs a data communication with an external device 30a and an external device 30b. Note that in the present embodiment, the external device 30a and the external device 30b may be collectively referred to as an "external device 30".

The information processing device 200 communicates with the external device 30 through a communication network 90 and a wireless communication system 92. The communication network 90 includes an IP network such as the Internet, a P2P network, a dedicated line including a VPN, a virtual network, and the like. In the present embodiment, the wireless communication system 92 is a mobile communication network connected to the communication network 90. For example, the wireless communication system 92 includes a wireless access network and a core network.

The external device 30a includes, for example, a server that provides a service to an occupant of the vehicle 50. For example, the external device 30a includes a server for storing content data such as a moving image, a server for providing an SNS (social networking service), or the like. The information processing device 200 receives moving image data from the external device 30a in response to an instruction from the occupant of the vehicle 50. Further, the information processing device 200 receives text information, voice information, image information, moving image information, or the like, as an SNS message, from the external device 30a in response to the instruction from the occupant of the vehicle 50. Further, the information processing device 200 transmits text information, voice information, image information, moving image information, or the like, as an SNS message from the occupant of the vehicle 50, to the external device 30a in response to the instruction from the occupant of the vehicle 50.

The external device 30b is, for example, a server that provides a service which relates to a control system of the vehicle 50. The external device 30b may include, for example, a server that collects control-system-related information for the vehicle 50. The control-system-related information collected by the external device 30 can be exemplified by LIDAR data or the like used for autonomous driving of the vehicle 50. The external device 30b may include, for example, a server that provides the control-system-related information to the vehicle 50. An example of the control-system-related information provided by the external device 30b may include map data or the like used for the autonomous driving of the vehicle 50. The information processing device 200 transmits, to the external device 30b, the LIDAR data or the like acquired for autonomous driving control. The information processing device 200 receives the map data from the external device 30b regardless of the instruction from the occupant of the vehicle 50.

The information processing device 200 controls communication throughput between the information processing device 200 and the external device 30 according to a priority of the data communication. For example, the data communication of SNS data or the like has a lower priority than the data communication of control-system-related information for the vehicle 50. The information processing device 200 predicts future communication throughput based on time series data of past communication throughput. When the communication throughput in the future is predicted to be lower, the information processing device 200 delays the data communication with the external device 30a, which has a lower priority than that of the control-system-related information for the vehicle 50, to the extent that a minimum quality of service can be maintained. Thereby, the communication throughput of the data communication of the control-system-related information for the vehicle 50 is maintained. Further, when the communication throughput is predicted to be even lower, and it is predicted that the minimum quality of service cannot be maintained in the data communication with the external device 30a, the information processing device 200 stops the data communication with the external device 30a to maintain the communication throughput of the data communication of the control-system-related information for the vehicle 50. In this way, by limiting the communication of the data with a low priority, the information processing device 200 can enhance a possibility of enabling the data communication with a high priority to continue.

Figure 2:
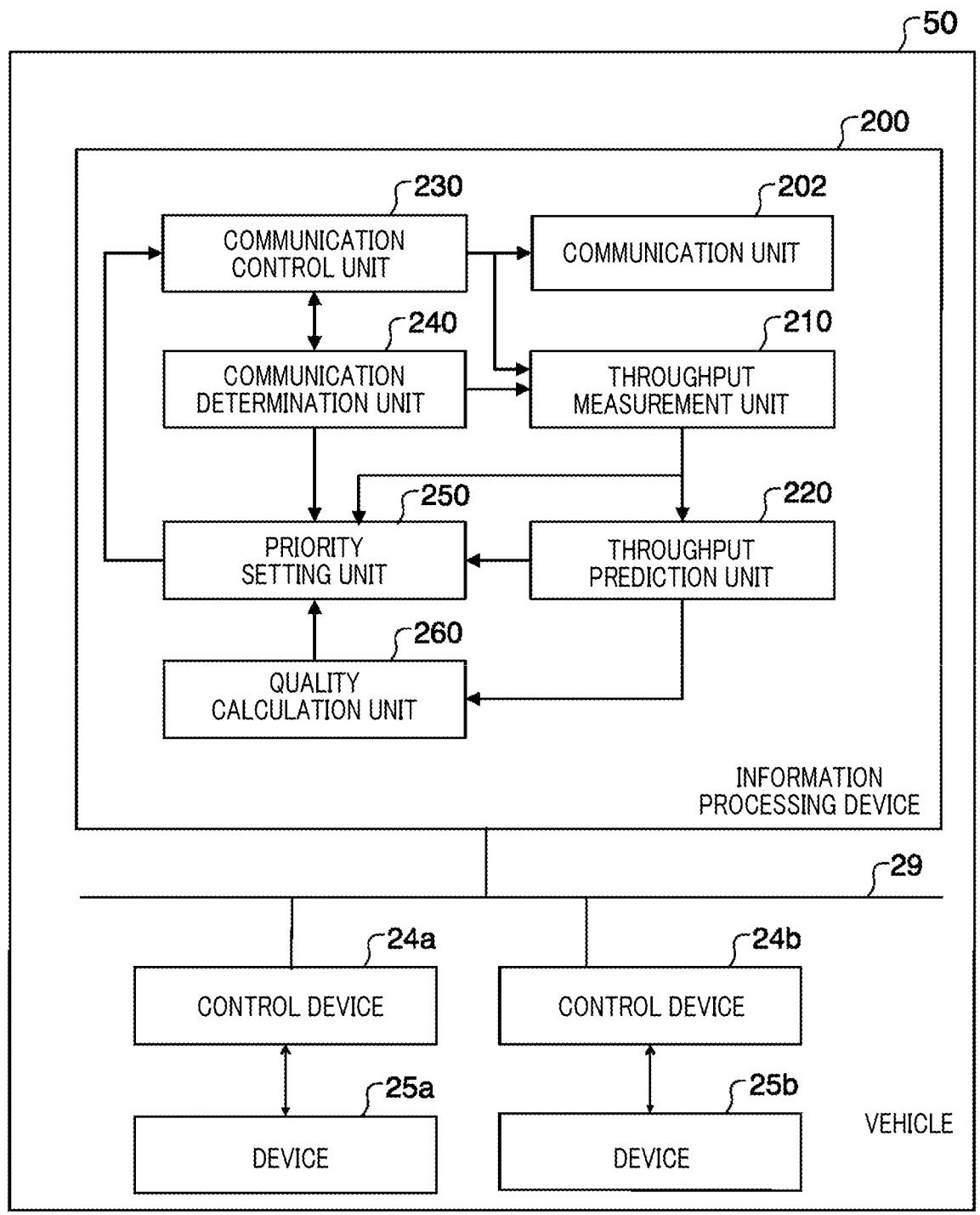
FIG. 2 schematically shows a functional configuration of the vehicle 50.

FIG. 2 schematically shows a functional configuration of the vehicle 50. The vehicle 50 includes the information processing device 200, a control device 24a, a control device 24b, a device 25a, a device 25b, and an in-vehicle network 29. The information processing device 200 includes a communication unit 202, a communication control unit 230, a throughput measurement unit 210, a throughput prediction unit 220, a communication determination unit 240, a priority setting unit 250, and a quality calculation unit 260. Note that FIG. 2 shows a functional block relating to the present embodiment. The vehicle 50 and the information processing device 200 may include a functional block other than the functional block shown in FIG. 2.

The information processing device 200, the control device 24a, and the control device 24b are connected to each other by the in-vehicle network 29. The in-vehicle network 29 may include an Ethernet (registered trademark) network. The in-vehicle network 29 may include a CAN (Controller Area Network).

The control device 24a and the control device 24b control the device 25a and the device 25b, respectively. Each of the control device 24a and the control device 24b may be an ECU (an Electronic Control Unit). The device 25a and the device 25b include, for example, a drive system device such as an engine, an information communication system device, or the like. An example of each of the control device 24a, the control device 24b, the device 25a, and the device 25b will be described in relation to FIG. 9 or the like. Note that the control device 24a and the control device 24b may be collectively referred to as a "control device 24". Further, the device 25a and the device 25b may be collectively referred to as a "device 25".

The communication unit 202 communicates with the external device 30 via the mobile communication network. The throughput measurement unit 210 measures the communication throughput between the communication unit 202 and the external device 30. Note that the throughput measurement unit 210 may measure the communication throughput in an upload direction from the communication unit 202 to the external device 30. The throughput measurement unit 210 may measure the communication throughput in a download direction from the external device 30 to the communication unit 202. The throughput prediction unit 220 predicts the future communication throughput by using at least the communication throughput measured by the throughput measurement unit 210. The communication control unit 230 controls the data communication with the external device 30 based on the communication throughput predicted by the throughput prediction unit 220. Specifically, the communication control unit 230 controls the data communication with the external device 30 by controlling the communication unit 202.

The communication determination unit 240 determines a type of the data communication with the external device 30. The priority setting unit 250 sets priorities of communications for a plurality of the data communications based on the type determined by the communication determination unit 240. The communication control unit 230 limits the communication throughput for the data communication for which the priority set by the priority setting unit 250 is low, in comparison with the data communication for which the priority set by the priority setting unit 250 is high, when the future communication throughput is below a predetermined threshold value. This makes it possible to enhance a possibility of enabling the data with a high priority to be continuously communicated. Note that when the future communication throughput is temporarily below a predetermined threshold value, the communication control unit 230 may not limit the communication throughput for the data communication with a low priority. For example, when the future communication throughput is below a predetermined threshold value for a time shorter than or equal to a predetermined time, the communication control unit 230 may not limit the communication throughput for the data communication with a low priority. When the future communication throughput is below a predetermined threshold value for a time longer than a predetermined time, the communication control unit 230 may limit the communication throughput for the data communication with a low priority. The predetermined threshold value may be a variable value. The communication control unit 230 may set the threshold value based on a state of the data communication with the external device 30. For example, the communication control unit 230 may set the threshold value based on the communication throughput required to provide the minimum quality of service in the data communication performed with the external device 30. The communication control unit 230 may set, as the threshold value, a value obtained by multiplying a predetermined coefficient by the communication throughput required to provide the minimum quality of service. The predetermined coefficient may be any value of 1 or more. The predetermined coefficient may be any value less than 1. Note that the predetermined threshold value may be a fixed value rather than a variable value.

The communication control unit 230 limits, by delaying the data communication, the communication throughput for the data communication for which the priority set by the priority setting unit 250 is low in comparison with the data communication for which the priority set by the priority setting unit 250 is high. The communication control unit 230 may delay the data communication by buffering the data communicated by the data communication with a low priority. The data with a high priority data is not delayed, and thus it is possible to enhance a possibility of enabling the data with a high priority to be continuously communicated. Note that the communication control unit 230 may limit the communication throughput by reducing an amount of the data for the data communication with a low priority. The communication control unit 230 may limit the communication throughput by reducing a bit rate of the data communication with a low priority. When the data that is transmitted by the data communication with a low priority is image data, the communication control unit 230 may limit the communication throughput by reducing an image quality of the image that is transmitted.

The throughput prediction unit 220 may predict the future communication throughput by using an amount of delay by which the communication control unit 230 delays the data communication with a low priority. The throughput prediction unit 220 predicts the future communication throughput in consideration of delay information, and thus it is possible to enhance a future prediction precision.

The communication determination unit 240 determines whether the data communication relates to a control of the vehicle 50, in determining a type of the data communication. The priority setting unit 250 sets a priority of the data communication, which relates to the control of the vehicle 50 and is predetermined, to be higher than a priority of another data communication. This makes it possible to continuously perform the data communication which relates to the control of the vehicle 50, and thus to enhance a traveling safety of the vehicle 50. The communication control unit 230 may stop another predetermined data communication, when it is not possible to ensure, as the communication throughput of the data communication which relates to the control system of the vehicle 50, a predetermined value required to continuously provide the service based on the data communication which relates to the control system of the vehicle 50. Note that the communication determination unit 240 may determine whether the data communication relates to a control of the vehicle 50, or a multimedia data communication, in determining a type of the data communication. The priority setting unit 250 may set a priority of the data communication, which relates to the control of the vehicle 50, to be higher than a priority of the multimedia data communication.

The communication control unit 230 may limit the communication throughput of the data communication with a low priority, to a predetermined value required to continuously provide the service based on the data communication with a low priority. This makes it possible to reduce a possibility of the data communication being completely disconnected even for the data communication with a low priority.

The quality calculation unit 260 calculates a quality of the data communication based on the communication throughput predicted by the throughput prediction unit 220. The priority setting unit 250 sets priorities of communications for the plurality of data communications based on the type determined by the communication determination unit 240 and the quality of the data communication. For example, the quality calculation unit 260 may calculate a multimedia quality (an MMq) (for example, the MMq as defined in ITU-T Recommendation G.1070). The priority setting unit 250 may set priorities of communications for the plurality of data communications based on the type determined by the communication determination unit 240 and the multimedia quality. Note that the quality calculation unit 260 may calculate any index indicating a quality of service, other than the multimedia quality, as the quality of the data communication.

FIG. 3 is a table showing a priority of a data communication. In the table of FIG. 3, a "category" indicates whether the data communication relates to the control system or a non-control system of the vehicle 50. A "property" indicates whether the data communication is steady or unsteady. A "service" indicates a content of the service provided by the data communication. As shown in FIG. 3, the data communication which relates to the service for the control system of the vehicle 50 has a higher priority than that of the data communication which relates to the service for the non-control system. Further, the steady data communication has a higher priority than that of the unsteady data communication. Note that the priority can be set for each service, in addition to the "category" and the "property" shown in FIG. 3.

FIG. 4 shows an example of a data structure of data communication information stored in an information processing device 200. The data communication information is obtained by associating an IP address, a port number, a priority, a type ID, and a minimum quality. The IP address is, for example, an IP address assigned to the control device 24. The port number is a port number used in a transport layer protocol in a TCP/communication. The "priority" indicates a priority assigned to the data communication identified by a combination of the IP address and the port number. The "type ID" indicates a type determined by the combination of the IP address and the port number. The "minimum quality" indicates a minimum quality of service required to maintain the service provided by the data communication. For example, as an index of the minimum quality, the MMq can be used.

In the present embodiment, the service for the data communication is determined, for example, among the services shown in FIG. 3, by the combination of the IP address and the port number included in a communication packet which is transmitted from the control device 24. The communication control unit 230 identifies the priority and the type of the data communication based on the combination of the IP address and the port number included in the communication packet and the data communication information. Note that when the data communication is a data transmission, the "IP address" is a source IP address and the "port number" is a source port number.

Figure 5:
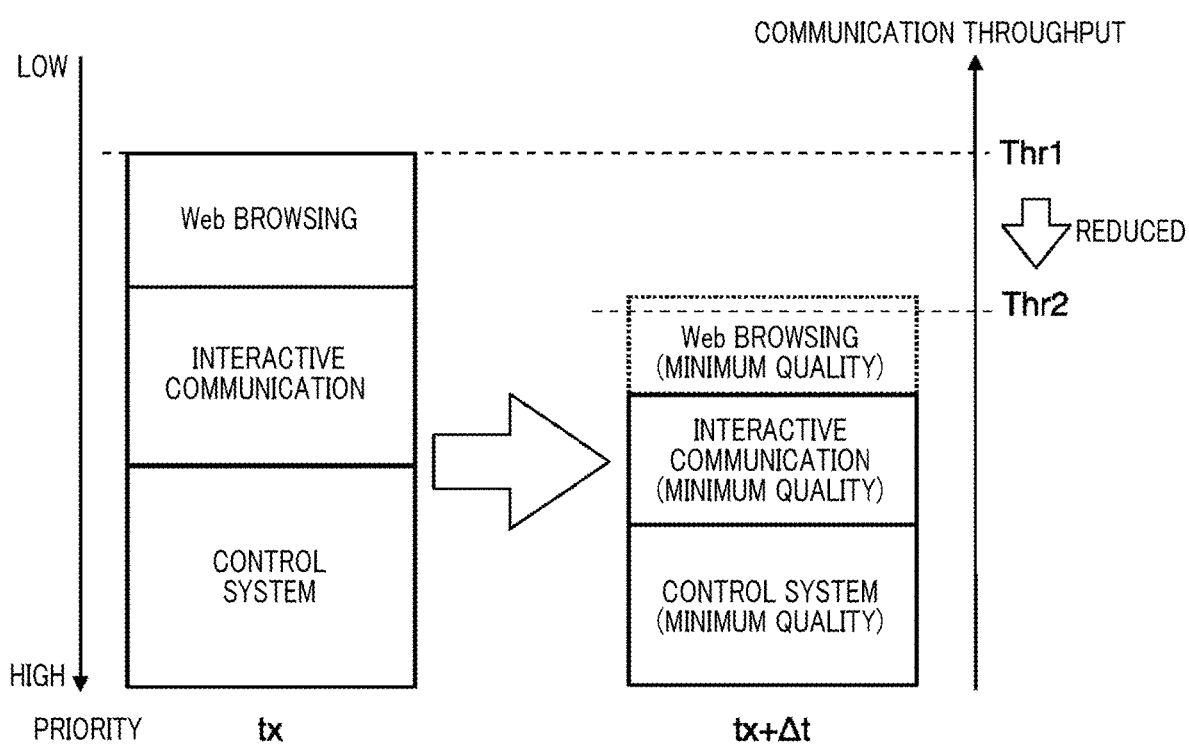
FIG. 5 conceptually shows a control of communication throughput performed by a communication control unit 230 based on the priority.

FIG. 5 conceptually shows a control of communication throughput performed by a communication control unit 230 based on the priority. The data communications of the control system, an interactive communication, and Web browsing are performed at a time tx. Here, the data communication of the control system has a higher priority than that of the data communication of the non-control system (the interactive communication and the Web browsing). Further, in the data communication of the non-control system, the data communication of the interactive communication has a higher priority than that of the data communication of the Web browsing.

A total value of the communication throughput at the time tx is Thr1. The throughput prediction unit 220 predicts that the communication throughput after Δt from the time tx will be reduced to Thr2. When it is determined that a total value of the communication throughput, which is required to provide the minimum quality of service required for each data communication that is currently performed, is higher than Thr2, the communication control unit 230 controls the throughput of each of the data communication of the control system and the data communication of the interactive communication data to a communication throughput value at which the minimum quality of service can be guaranteed. Further, the communication control unit 230 temporarily stops the data communication of the Web browsing. This makes it possible for the total communication throughput not to be higher than the predicted throughput while the data communication which relates to the control system of the vehicle 50 is maintained.

Figure 6:
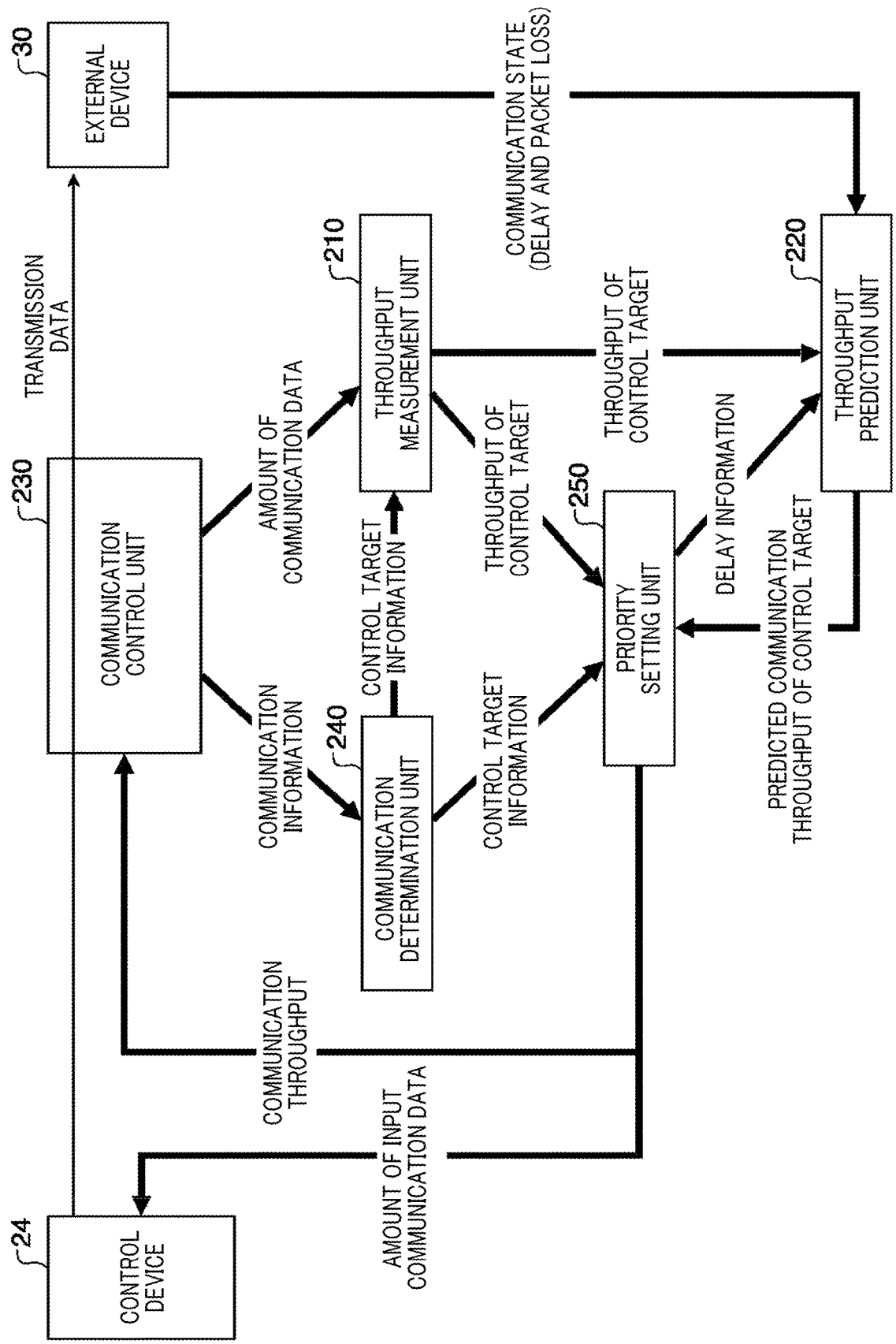
FIG. 6 schematically shows a flow of data between functional blocks of the information processing device 200.

FIG. 6 schematically shows a flow of data between functional blocks of the information processing device 200.

The communication control unit 230 monitors transmission data that is transmitted from the control device 24. The communication control unit 230 determines whether the data communication for a new service is started based on the combination of the IP address and the port number. When a new communication is started, the communication control unit 230 notifies the communication determination unit 240 of the communication information including the IP address and the port number. The communication control unit 230 transmits, to the throughput measurement unit 210, information indicating an amount of the data for the communication with the external device 30, in response to a request of the throughput measurement unit 210.

The communication determination unit 240 determines the type of the data communication based on the communication information. For example, the communication determination unit 240 determines the type of the data communication based on the IP address and the port number. The communication determination unit 240 determines the type of the data communication based on the data communication information shown in FIG. 4. The communication determination unit 240 notifies the throughput measurement unit 210 and the priority setting unit 250 of control target information including the type of the data communication.

The throughput measurement unit 210 measures the communication throughput between the communication unit 202 and the external device 30. The throughput measurement unit 210 calculates the current communication throughput based on the amount of the communication data notified from the communication control unit 230. The throughput measurement unit 210 may measure the communication throughput for each control target information. The throughput measurement unit 210 may measure the total communication throughput. The throughput measurement unit 210 notifies the priority setting unit 250 and the throughput prediction unit 220 of the measured communication throughput of the control target.

The throughput prediction unit 220 predicts the future communication throughput based on the communication throughput measured by the throughput measurement unit 210. For example, the throughput prediction unit 220 identifies a prediction model of the time series data based on the time series data of the communication throughput. The prediction model to be identified may be any model as long as the model can predict future time series data from past time series data. For example, the prediction model to be identified can be exemplified by a time series model such as an AR model (AutoRegressive Model), a stochastic differential equation model such as a Vasicek model, or the like. As an example, when the Vasicek model is used, a model parameter of a general solution of the stochastic differential equation of the Vasicek model may be identified by using the general solution of the stochastic differential equation of the Vasicek model and the time series data are used, and using a method such as a maximum likelihood estimation method. The throughput prediction unit 220 calculates a probability distribution of the time series data of the future communication throughput based on the identified prediction model. The throughput prediction unit 220 may predict the future communication throughput based on the probability distribution of the time series data of the future communication throughput. Note that the throughput prediction unit 220 may calculate the probability distribution of the time series data of the future communication throughput by using methods disclosed in Patent Document 1 and Patent Document 2. As described in Patent Document 1 and Patent Document 2, by using a correction factor calculated based on a communication model obtained by modeling a transient characteristic of a communication protocol of the TCP communication or the like after the start of the communication, and by correcting the time series data to eliminate an influence of the transient characteristic, and based on the corrected time series data, the prediction model of the time series data may be identified.

The throughput prediction unit 220 may predict the communication throughput based on a communication state fed back from the external device 30. The throughput prediction unit 220 may predict the future communication throughput for each control target for the communication throughput. The communication state fed back from the external device 30 can be exemplified by a network transfer delay, a packet loss rate, and the like. The throughput prediction unit 220 notifies the priority setting unit 250 of the predicted future communication throughput. The throughput prediction unit 220 may calculate the future communication throughput based on the delay information set by the priority setting unit 250 as described below.

The priority setting unit 250 respectively sets priorities for the data communications to determine the communication throughput of each of the data communications. Based on the control target information for each type of the data communication notified from the communication determination unit 240, the type of data communication, which is the control target, notified from the communication determination unit 240, and the predicted communication throughput notified from the throughput prediction unit 220, the priority setting unit 250 sets a priority for each type of the data communication to set the communication throughput according to the priority. The priority setting unit 250 may set the amount of delay in the data communication such that the set communication throughput can be obtained. The priority setting unit 250 may notify the throughput prediction unit 220 of the set amount of delay in the data communication.

Note that the quality calculation unit 260 may calculate an index value of the quality of service based on the future communication throughput. The index value of the quality of communication may be the MMq. The priority setting unit 250 may calculate the communication throughput based on the quality of service calculated by the quality calculation unit 260. For example, the priority setting unit 250 may refer to associated information obtained by associating a predetermined index value of the quality of communication with the communication throughput, to select the communication throughput associated with the index value lower than or equal to the quality of communication calculated by the quality calculation unit 260. The priority setting unit 250 may set, for the data communication with a priority higher than a predetermined value, the communication throughput corresponding to the quality of service higher than or equal to the minimum quality, and sets, for the data communication with a priority lower than the predetermined value, sets the communication throughput corresponding to the minimum quality of service, for adaptation to the future communication throughput.

The priority setting unit 250 notifies the communication control unit 230 of the set communication throughput. The communication control unit 230 delays the transmission data for each type of the data communication according to the communication throughput for each type of the data communication notified from the priority setting unit 250. Further, the priority setting unit 250 notifies the control device 24 of an amount of input communication data per unit time corresponding to the set communication throughput. The control device 24 limits the transmission of the transmission data for each type of the data communication according to the amount of input communication data notified from the priority setting unit 250. For example, the control device 24 limits an amount of data that is transmitted to the external device 30 for each service determined by the port number. This makes it possible to properly limit the communication throughput according to the priority of the data communication.

Figure 7:
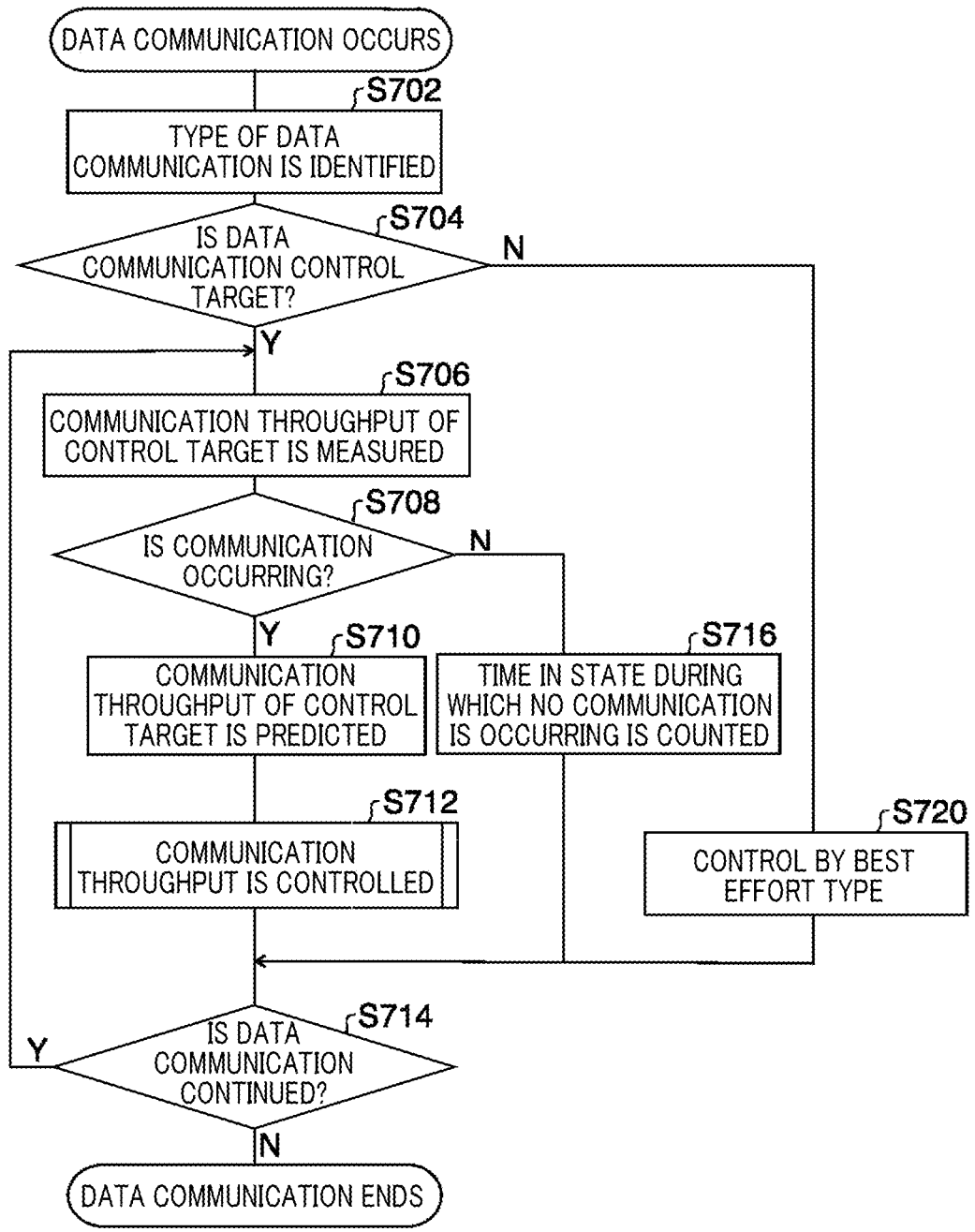
FIG. 7 shows a flowchart relating to an information processing method executed by the information processing device 200.

FIG. 7 shows a flowchart relating to an information processing method executed by the information processing device 200. Processing of the flowchart is started when the communication control unit 230 detects an occurrence of the communication with the external device 30.

In S702, the communication determination unit 240 identifies the type of the data communication that has occurred. For example, the communication determination unit 240 identifies the type of the data communication that has occurred based on the IP address and the port number. In S704, the communication determination unit 240 determines whether the data communication that has occurred is the control target for the communication throughput. When the data communication that has occurred is not the control target for the communication throughput, the communication control unit 230 determines a best effort type control scheme as a control scheme of the data communication that has occurred, in S720, and the processing proceeds to S714. When the data communication that has occurred is the control target for the communication throughput, the throughput measurement unit 210 measures the communication throughput of the control target in S706. In S708, the throughput measurement unit 210 determines whether the communication is occurring.

When it is determined that no communication is occurring in S708, the throughput measurement unit 210 counts a time during which no communication is occurring, in S716, and the processing proceeds to S714. For example, the throughput measurement unit 210 counts an elapsed time from a timing when it is determined that no communication has occurred. When it is determined that the communication is occurring in S708, the throughput prediction unit 220 predicts the future throughput of the control target for the communication throughput (S710). In S712, the communication control unit 230 controls the communication throughput, and the processing proceeds to S714. Note that the processing of S712 will be described in relation to FIG. 8 and the like.

In S714, the communication control unit 230 determines whether the data communication is continued. When the time, during which no communication is occurring and which is counted by the throughput measurement unit 210, is longer than a predetermined value, the communication control unit 230 determines that the data communication is not continued. Further, when receiving information for disconnecting the communication from the control device 24, the communication control unit 230 determines that the data communication is not continued. When it is determined that the data communication is continued in S714, the processing proceeds to S706. When it is determined that the data communication is not continued in S714, the data communication ends.

Figure 8:
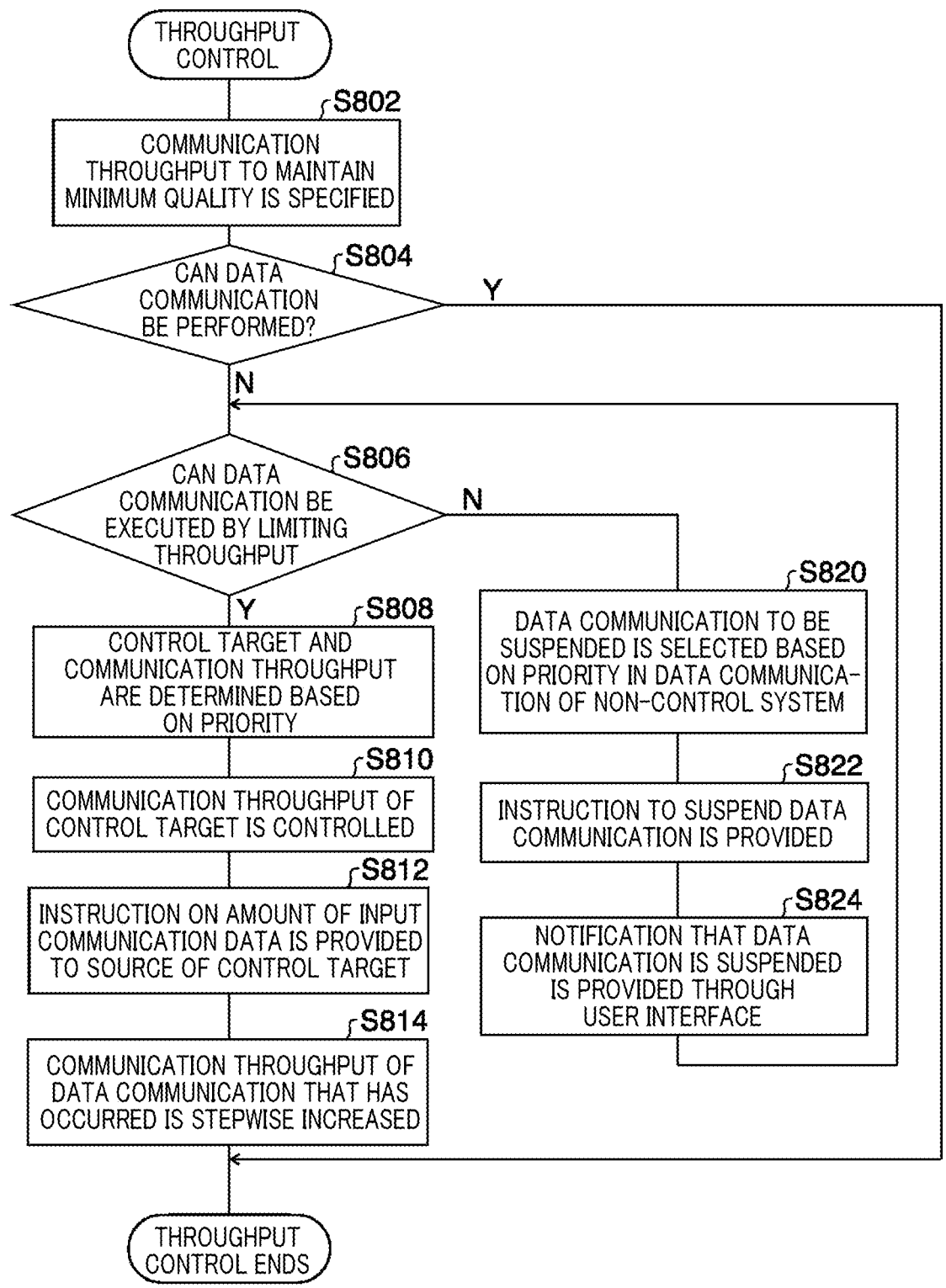
FIG. 8 shows a flowchart relating to a control method for the communication throughput executed by the information processing device 200.

FIG. 8 shows a flowchart relating to a control method for the communication throughput executed by the information processing device 200. Processing of the flowchart can be applied to the processing of S712.

In S802, the priority setting unit 250 specifies the communication throughput (minimum throughput) required to ensure the minimum quality of service for the data communication that is the control target for the communication throughput. For example, the priority setting unit 250 specifies the minimum throughput for the data communication that is the control target for the communication throughput based on quality information of the data communication information.

In S804, the priority setting unit 250 determines whether the data communication can be performed based on the future communication throughput predicted by the throughput prediction unit 220. The priority setting unit 250 determines whether the quality of service which is calculated and predicted by the quality calculation unit 260 is higher than or equal to the minimum quality determined by the data communication information. When the data communication can be performed, the processing of the flowchart ends.

When it is determined that the data communication can be executed, the priority setting unit 250 determines whether the data communication can be executed by limiting the communication throughput of the data communication with a low priority, in S806. When it is determined that the data communication can be executed by limiting the communication throughput of the data communication with a low priority, the data communication and the communication throughput, which are the control target for the communication throughput, are determined based on the priority, in S808. In S810, the communication control unit 230 limits the communication throughput of the data communication of the control target. In S812, the priority setting unit 250 provides an instruction on the amount of the input communication data to the control device 24 that performs the data communication, which is the control target. In S814, the communication control unit 230 increases the communication throughput of the data communication stepwise toward the minimum throughput, to end the processing of the flowchart.

When it is determined that the data communication cannot be executed even by limiting the communication throughput in S806, the priority setting unit 250 selects the data communication to be suspended based on the priority in the data communication of the non-control system in which the data communication is currently occurring in S820. For example, the priority setting unit 250 selects the data communication to be suspended in ascending order of priority. In S822, the priority setting unit 250 instructs the control device 24 that performs the selected data communication to suspend the selected data communication. In S824, the control device 24 notifies the occupant of the vehicle 50 through a user interface that the data communication is temporarily suspended, and the processing proceeds to S806.

Figure 9:
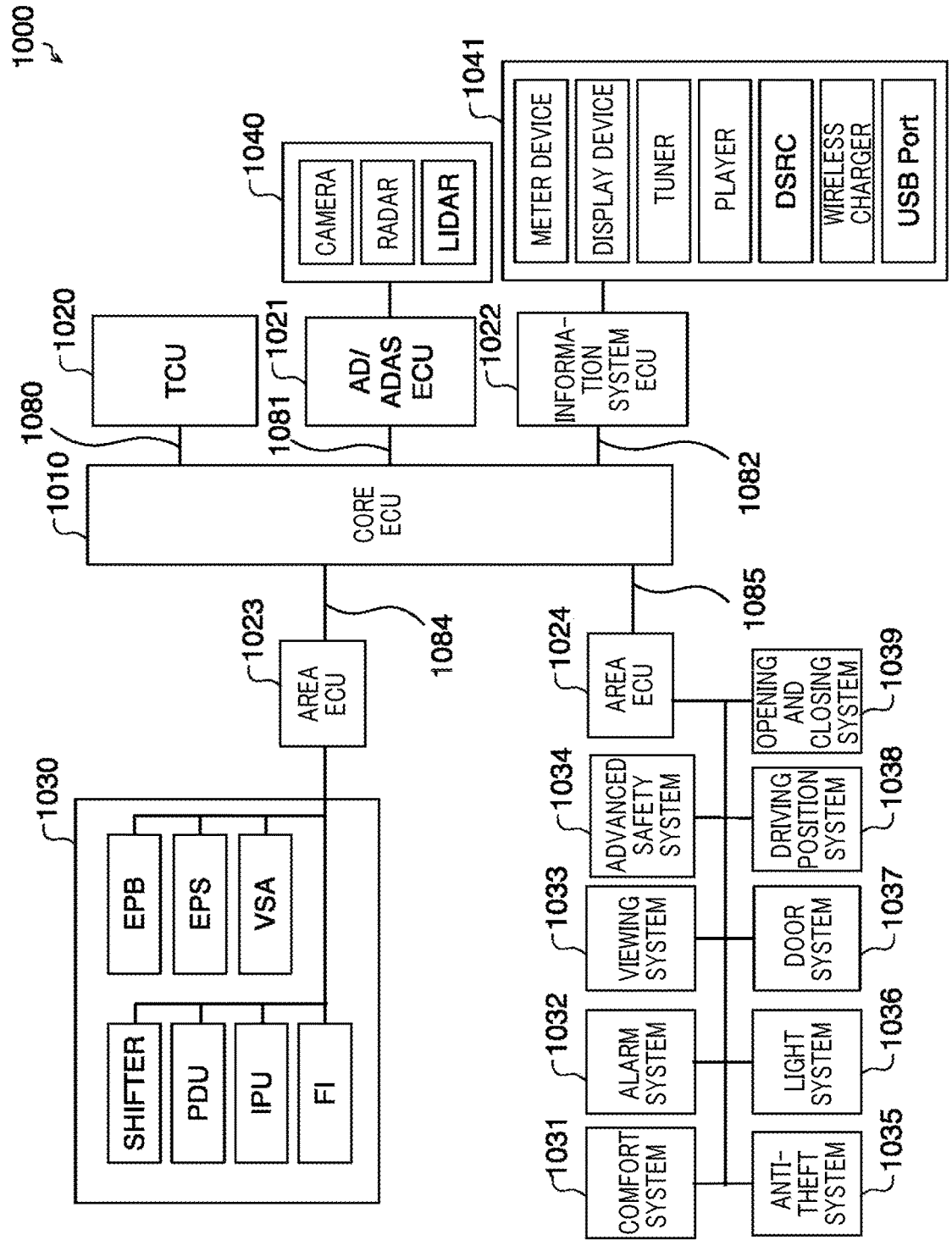
FIG. 9 shows an implementation example of a control system 1000 in the vehicle 50.

FIG. 9 shows an implementation example of a control system in the vehicle 50. A control system 1000 includes a core ECU 1010, a TCU 1020, an AD/ADAS ECU 1021, an information system ECU 1022, an area ECU 1023, an area ECU 1024, a sensor device 1040, an information system device 1041, a drive system device 1030, a comfort system device 1031, an alarm system device 1032, a viewing system device 1033, an advanced safety system device 1034, an anti-theft system device 1035, a light system device 1036, a door system device 1037, a driving position system device 1038, an opening and closing system device 1039, a communication network 1080, a communication network 1081, a communication network 1082, a communication network 1084, and a communication network 1085. The AD/ADAS ECU 1021 is an ECU that performs a control which relates to autonomous driving (AD) and advanced driver assistance systems (ADAS).

The TCU 1020 is a telematics control unit. The TCU 1020 is an implementation example of the information processing device 200 described above. Note that the TCU 1020 and the core ECU 1010 may cooperate with each other to function as the information processing device 200 described above. The AD/ADAS ECU 1021, the information system ECU 1022, the area ECU 1023, and the area ECU 1024 are respectively implementation examples of the control device 24 described above.

The communication network 1080, the communication network 1081, the communication network 1082, the communication network 1084, and the communication network 1085 are implementation examples of the in-vehicle network 29. The communication network 1080, the communication network 1081, the communication network 1082, the communication network 1084, and the communication network 1085 may include the Ethernet network. The TCU 1020, the core ECU 1010, the AD/ADAS ECU 1021, the information system ECU 1022, the area ECU 1023, and the area ECU 1024 may be capable of IP communications via the communication network 1080, the communication network 1081, the communication network 1082, the communication network 1084, and the communication network 1085. Note that the communication network 1084 and the communication network 1085 may include the CAN.

The sensor device 1040 has a sensor including a camera, a radar, and a LIDAR. The AD/ADAS ECU 1021 is connected to each sensor included in the sensor device 1040 through a bus, controls each sensor included in the sensor device 1040, to acquire information detected by each sensor.

The information system device 1041 has a device including a meter device, a display device, a tuner, a player, a DSRC (Dedicated Short Range Communications) system, a wireless charger, and a USB port. The information system ECU 1022 is connected to each device included in the information system device 1041 through the bus, and controls each device included in the information system device 1041. The information system device 1041 includes an information communication device, a multimedia-related device, and a user interface device.

The drive system device 1030 has a device including an electronic parking brake (EPB), an electric power steering system (EPS), a vehicle behavior stabilization control system (VSA), a shifter (SHIFTER), a power drive unit (PDU), and an intelligent power unit (IPU), and a fuel injection (FI) device. The drive system device 1030 is connected to each device included in the drive system device 1030 through the bus, and controls each device included in the drive system device 1030.

The area ECU 1024 is connected, through the bus, to the comfort system device 1031, the alarm system device 1032, the viewing system device 1033, the advanced safety system device 1034, the anti-theft system device 1035, the light system device 1036, the door system device 1037, the driving position system device 1038, and the opening and closing system device 1039; and controls devices included in the comfort system device 1031, the alarm system device 1032, the viewing system device 1033, the advanced safety system device 1034, the anti-theft system device 1035, the light system device 1036, the door system device 1037, the driving position system device 1038, and the opening and closing system device 1039. The comfort system device 1031, the alarm system device 1032, the viewing system device 1033, the advanced safety system device 1034, the anti-theft system device 1035, the light system device 1036, the door system device 1037, the driving position system device 1038, and the opening and closing system device 1039 mainly include auxiliary devices of the vehicle 50.

The drive system device 1030. the sensor device 1040, the comfort system device 1031, the alarm system device 1032, the viewing system device 1033, the advanced safety system device 1034, the anti-theft system device 1035, the light system device 1036, the door system device 1037, the driving position system device 1038, and the opening and closing system device 1039 are devices of the control system of the vehicle 50. The information system device 1041 is a device of the non-control system.

The data communication, which relates to the device included in the sensor device 1040, the drive system device 1030. the comfort system device 1031, the alarm system device 1032, the viewing system device 1033, the advanced safety system device 1034, the anti-theft system device 1035, the light system device 1036, the door system device 1037, the driving position system device 1038, and the opening and closing system device 1039, may have a lower priority than that of the data communication which relates to the device included in the information system device 1041.

Note that the vehicle 50 may be an example of a moving object. An example of the moving object includes an automobile such as a passenger car and a bus, a saddle riding type vehicle, and transportation equipment such as an aircraft and a ship. The moving object is not limited to the transportation equipment, and may be any movable equipment.

As described above, with the information processing device 200 and an implementation example of the information processing device 200, it is possible to enhance a possibility of enabling the data communication with a high priority to continue, by limiting the data communication with a low priority. Typically, when the plurality of data communications are performed in a device mounted on a moving object, it is required to communicate in a communication speed (also referred to as a communication band). However, it is not always possible to obtain a proper communication speed in all of the plurality of data communications. For example, when the communication speed is reduced due to a deterioration of a communication environment, there is a problem that the data communication with a high priority may be limited. In contrast, with the information processing device 200 described above, such a problem can be alleviated.

Figure 10:
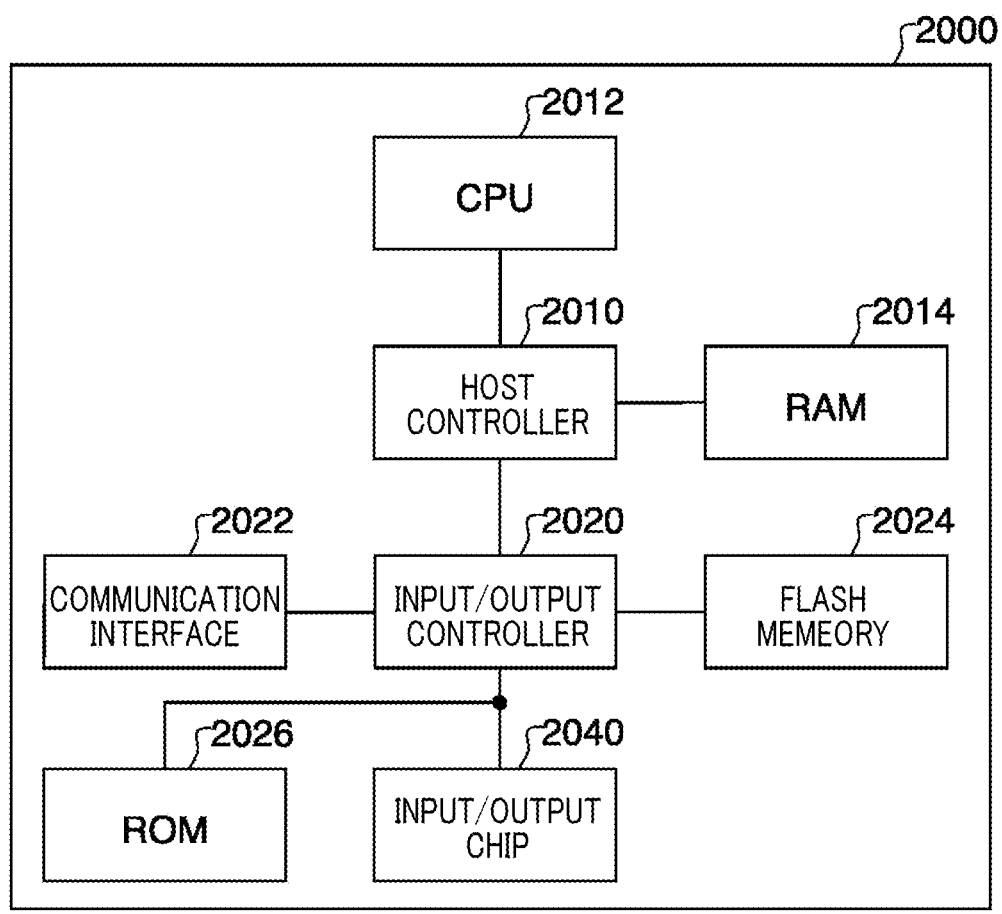
FIG. 10 shows an example of a computer 2000.

FIG. 10 shows an example of a computer 2000 in which a plurality of embodiments of the present invention may be entirely or partially embodied. A program installed on the computer 2000 can cause the computer 2000 to function as a device such as the information processing device or each unit of the device according to the embodiment, or to execute an operation associated with the device or each unit of the device, and/or to execute a process or steps of the process according to the embodiment. Such a program may be executed by a CPU 2012 to cause the computer 2000 to execute the specific operation associated with some or all of the blocks of the processing procedure and the block diagram described in the present specification.

The computer 2000 according to the present embodiment includes the CPU 2012, and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores programs and data used by the CPU 2012 in the computer 2000. The ROM 2026 stores a boot program or the like that is executed by the computer 2000 during activation, and/or a program that depends on hardware of the computer 2000. In addition, the input/output chip 2040 may connect various input/output units such as a keyboard, a mouse, and a monitor to the input/output controller 2020 via an input/output port such as a serial port, a parallel port, a keyboard port, a mouse port, a monitor port, a USB port, an HDMI (registered trademark) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014, or the ROM 2026, and is executed by the CPU 2012. Information processing written in these programs is read by the computer 2000, resulting in cooperation between a program and the above-mentioned various types of hardware resources. A device or a method may be configured by implementing the operation or process of the information according to the use of the computer 2000.

For example, when a communication is executed between the computer 2000 and an external device, the CPU 2012 may execute a communication program loaded in the RAM 2014, and instruct the communication interface 2022 to process the communication based on the processing written in the communication program. Under the control of the CPU 2012, the communication interface 2022 reads transmission data stored in a transmission buffer region provided in a recording medium such as the RAM 2014 and the flash memory 2024, transmits the read transmission data to the network, or writes received data which is received from the network to a receiving buffer region or the like provided on the recording medium.

In addition, the CPU 2012 may cause all or a necessary portion of a file or a database to be read into the RAM 2014, the file or the database having been stored in the recording medium such as the flash memory 2024, etc., and perform various types of processing on the data on the RAM 2014. The CPU 2012 then writes back the processed data to the recording medium.

Various types of information, such as various types of programs, data, tables, and databases, may be stored in the recording medium to undergo information processing. The CPU 2012 may execute various types of processing on the data read from the RAM 2014 to write back a result to the RAM 2014, the processing being described in the present specification, specified by instruction sequences of the programs, and including various types of operations, information processing, condition determinations, conditional branching, unconditional branching, information retrievals/replacements, or the like. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The program or software module described above may be stored on the computer 2000 or in a computer-readable storage medium near the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

A program, which is installed on the computer 2000 and causes the computer 2000 to function as the information processing device 200, may work on the CPU 2012 or the like to cause the computer 2000 to function as each unit of the information processing device 200. Information processing written in these programs functions as each unit of the information processing device 200 that is specific means by which software and the above-described various hardware resources cooperate by being read by the computer 2000. Then, by the specific means realizing calculation or processing of information according to a purpose of use of the computer 2000 in the present embodiment, the unique information processing device 200 according to the purpose of use is constructed.

Various embodiments have been described with reference to the block diagrams or the like. Blocks in the block diagrams may respectively represent (1) steps of processes in which operations are performed or (2) "units" of apparatuses responsible for performing operations. Certain steps and "units" may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits, and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

Computer-readable storage media may include any tangible device that can store instructions to be executed by a suitable device, and as a result, the computer-readable storage medium having the instructions stored thereon constitutes at least a part of an article of manufacture including instructions which can be executed to create means for performing operations specified in the processing procedures or block diagrams. Examples of computer-readable storage media may include an electronic storage medium, a magnetic storage medium, an optical storage medium, an electromagnetic storage medium, a semiconductor storage medium, etc. Specific examples of the computer-readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disc (DVD), a Blu-ray (registered trademark) disc, a memory stick, an integrated circuit card, or the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general-purpose computer, special purpose computer, or other programmable data processing apparatus, or to programmable circuitry, locally or via a local area network (LAN), wide area network (WAN) such as the Internet, etc., so that the computer-readable instructions is executed to create means for performing operations specified in the described processing procedures or block diagrams. Examples of the processor include a computer processor, a processing unit, a microprocessor, a digital signal processor, a controller, a microcontroller, and the like.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order. EXPLANATION OF REFERENCES 24 control device
25 device
29 in-vehicle network
30 external device
50 vehicle
90 communication network
92 wireless communication system
210 throughput measurement unit
220 throughput prediction unit
230 communication control unit
240 communication determination unit
250 priority setting unit
260 quality calculation unit
200 information processing device
202 communication unit
1010 core ECU
1020 TCU
1021 AD/ADAS ECU
1022 information system ECU
1023 area ECU
1024 area ECU
1030 drive system device
1031 comfort system device
1032 alarm system device
1033 viewing system device
1034 advanced safety system device
1035 anti-theft system device
1036 light system device
1037 door system device
1038 driving position system device
1039 opening and closing system device
1040 sensor device
1041 information system device
1080 communication network
1081 communication network
1082 communication network
1084 communication network
1085 communication network
2000 computer
2010 host controller
2012 CPU
2014 RAM
2020 input/output controller
2022 communication interface
2024 flash memory
2026 ROM
2040 input/output chip

What is claimed is:

1. An information processing device that has a communication unit configured to wirelessly communicate with an external device, the information processing device comprising:
at least one processor;
a throughput measurement unit configured to measure, using the at least one processor, communication throughput between the information processing device and the external device;
a throughput prediction unit configured to, using the at least one processor, predict future communication throughput by using at least data of the communication throughput measured by the throughput measurement unit;
a communication control unit configured to, using the at least one processor, control data communication with the external device based on the communication throughput predicted by the throughput prediction unit;
a communication determination unit configured to, using the at least one processor, determine a type of the data communication with the external device; and
a priority setting unit configured to, using the at least one processor, set priorities of communications for a plurality of the data communications based on the type determined by the communication determination unit, wherein the communication control unit is configured to, using the at least one processor, limit the communication throughput for the data communication for which the priority set by the priority setting unit is low, in comparison with the data communication for which the priority set by the priority setting unit is high, when the future communication throughput is below a predetermined threshold value, the communication control unit is configured to limit, using the at least one processor, by delaying the data communication, the communication throughput for the data communication for which the priority set by the priority setting unit is low in comparison with the data communication for which the priority set by the priority setting unit is high, and the throughput prediction unit is configured to predict, using the at least one processor, the future communication throughput by using an amount of delay by which the communication control unit delays the data communication with a low priority.

2. The information processing device according to claim 1, wherein the information processing device is mounted on a vehicle, the communication determination unit is configured to determine, using the at least one processor, whether the data communication relates to a control of the vehicle, in determining a type of the data communication, and the priority setting unit is configured to set, using the at least one processor, a priority of the data communication, which relates to the control of the vehicle and is predetermined, to be higher than a priority of another data communication.

3. The information processing device according to claim 2, wherein the communication determination unit is configured to determine, using the at least one processor, whether the data communication relates to the control of the vehicle, or a multimedia data communication, in determining a type of the data communication, and the priority setting unit is configured to set, using the at least one processor, a priority of the data communication, which relates to the control of the vehicle, to be higher than a priority of the multimedia data communication.

4. The information processing device according to claim 1, wherein the communication control unit is configured to limit, using the at least one processor, the communication throughput of the data communication with a low priority, to a predetermined value required to continuously provide a service based on the data communication with a low priority.

5. The information processing device according to claim 4, wherein the information processing device is mounted on a vehicle, the communication determination unit is configured to determine, using the at least one processor, whether the data communication relates to a control of the vehicle, in determining a type of the data communication, and the communication control unit is configured to stop, using the at least one processor, another predetermined data communication, when it is not possible to ensure, as the communication throughput of the data communication which relates to a control system of the vehicle, a predetermined value required to continuously provide a service based on the data communication which relates to the control system of the vehicle.

6. The information processing device according to claim 1, further comprising:

a quality calculation unit configured to calculate, using the at least one processor, a multimedia quality based on the communication throughput predicted by the throughput prediction unit, wherein the priority setting unit is configured to set, using the at least one processor, priorities of communications for the plurality of data communications based on the type determined by the communication determination unit and the multimedia quality.

7. A vehicle comprising: the information processing device according to claim 1.

8. A non-transitory computer-readable storage medium having stored thereon a program that causes a computer, which has a communication unit configured to wirelessly communicate with an external device, to function as:

a throughput measurement unit configured to measure communication throughput between an information processing device and the external device;

a throughput prediction unit configured to predict future communication throughput by using at least data of the communication throughput measured by the throughput measurement unit;

a communication control unit configured to control data communication with the external device based on the communication throughput predicted by the throughput prediction unit;

a communication determination unit configured to determine a type of the data communication with the external device; and a priority setting unit configured to set priorities of communications for a plurality of the data communications based on the type determined by the communication determination unit, wherein the communication control unit is configured to limit the communication throughput for the data communication for which the priority set by the priority setting unit is low, in comparison with the data communication for which the priority set by the priority setting unit is high, when the future communication throughput is below a predetermined threshold value, the communication control unit is configured to limit, by delaying the data communication, the communication throughput for the data communication for which the priority set by the priority setting unit is low in comparison with the data communication for which the priority set by the priority setting unit is high, and the throughput prediction unit is configured to predict the future communication throughput by using an amount of delay by which the communication control unit delays the data communication with a low priority.

9. An information processing method comprising, in an information processing device that has a communication unit configured to wirelessly communicate with an external device:

measuring communication throughput between the information processing device and the external device;

predicting future communication throughput by using at least data of the measured communication throughput;

controlling data communication with the external device based on the predicted communication throughput;

determining a type of the data communication with the external device; and setting priorities of communications for a plurality of the data communications based on the type, wherein the controlling the data communication with the external device includes limiting the communication throughput for the data communication for which the set priority is low, in comparison with the data communication for which the set priority is high, when the future communication throughput is below a predetermined threshold value, the controlling the data communication with the external device further includes limiting, by delaying the data communication, the communication throughput for the data communication for which the set priority is low in comparison with the data communication for which the set priority is high, and the predicting the future communication throughput includes predicting the future communication throughput by using an amount of delay of the data communication having a low priority.

* * * * *